May 18, 1965 L. KUFERT 3,184,667
ALTITUDE SELECTOR SYSTEM FOR AUTOMATIC PILOT
Filed Oct. 26, 1962
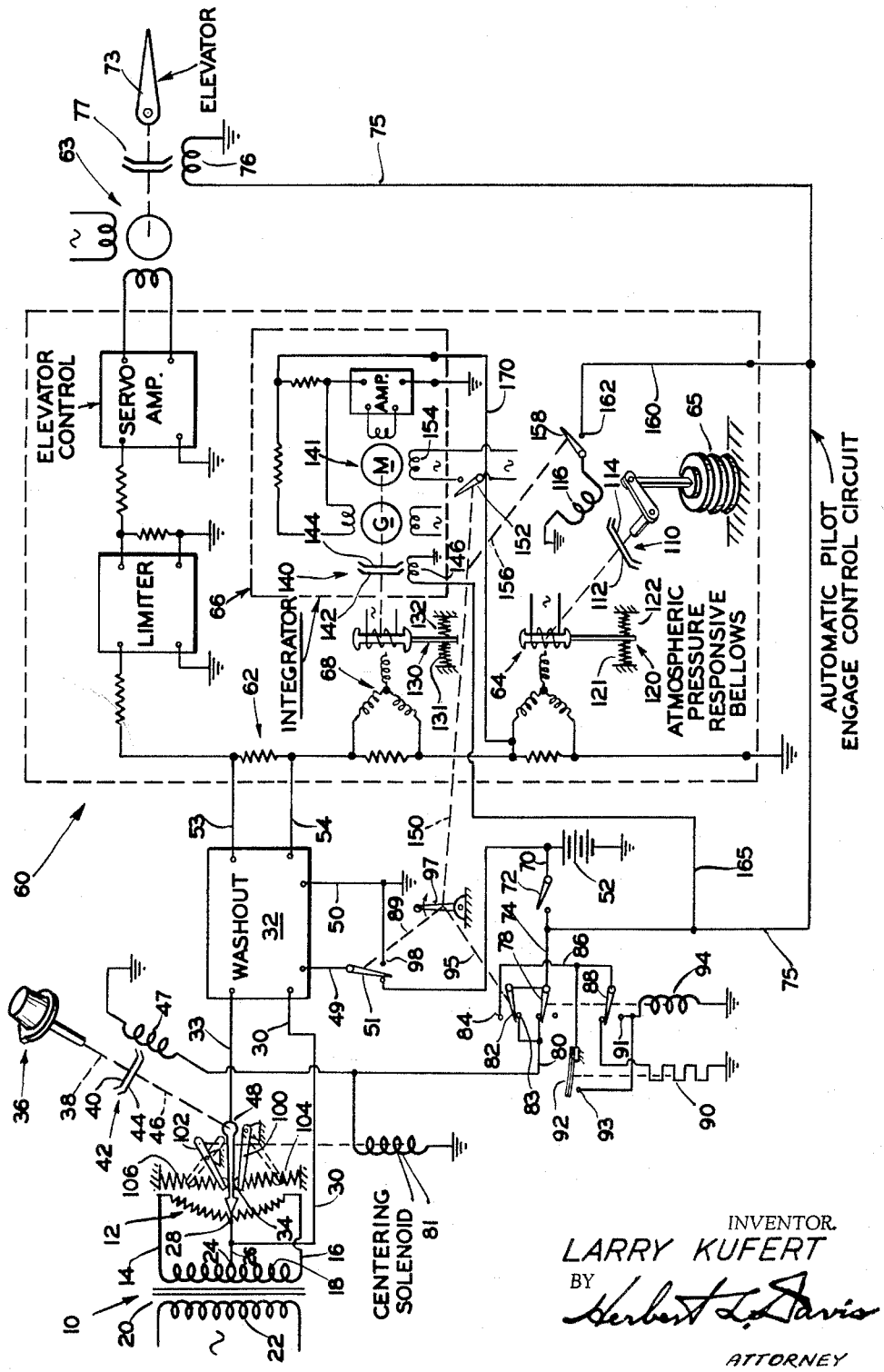
INVENTOR.
*LARRY KUFERT*
BY *Herbert L. Davis*
ATTORNEY

United States Patent Office 3,184,667
Patented May 18, 1965

3,184,667
ALTITUDE SELECTOR SYSTEM FOR AUTOMATIC
PILOT
Larry Kufert, Wayne, N.J., assignor to The Bendix Corporation, Teterboro, N.J., a corporation of Delaware
Filed Oct. 26, 1962, Ser. No. 233,363
10 Claims. (Cl. 318—489)

This invention relates to an altitude selector system for an automatic pilot and more particularly to means for enhancing automatic pilot operation when the pilot is flying an aircraft in a repeating pattern that requires alternating altitude control and stepping up or down to a new altitude.

Heretofore, in flying such an alternating pattern, in the operation of prior devices, there has resulted a loss of pitch controller command and/or integrator authority.

An object of the invention is to provide novel means for effecting operation of a pitch controller potentiometer so as to return the same to a center or null position a predetermined delay period after the controller signal has been discontinued.

Another object of the invention is to provide a novel controller system whereby the pitch controller may be recentered on altitude hold so that there is no possibility of losing controller command.

Another object of the invention is to provide in the aforenoted arrangement means whereby a controller signal may be effectively washed out so that the integrator may be relieved of this burden to increase the integrator authority for holding the aircraft at the selected altitude.

Another object of the invention is to provide in such an arrangement novel means to cause the aircraft to level out to a new altitude more rapidly than under the prior control system and with less overshoot by the provision of novel means whereby the controller command is zeroed rapidly by the wash out, and thereafter the controller is recentered on altitude hold.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

In the drawing:

The drawing is a schematic showing of the invention.

Referring ot the drawing, there is indicated by the numeral 10 a pitch controller, including a potentiometer 12 having the opposite ends thereof connected by conductors 14 and 16 across a secondary winding 18 of a transformer 20, including a primary winding 22 connected across a suitable source of alternating current. A center tap 24 on the secondary winding 18 is connected by a conductor 26 to a center tap 28 on the potentiometer 12 while a conductor 30 leads from the conductor 26 to an input terminal of a suitable wash out circuit 32 of conventional type. A second input conductor 33 leads from an operator-operative adjustable arm 34 of the potentiometer 12 to another input terminal of the wash-out circuit 32.

An operator-operative knob 3 6is connected by a shaft 38 to one plate 40 of a suitable clutch 42 while an opposite plate 44 of the clutch is connected by a shaft 46 to a pivotal member 48 for operating the arm 34. The plates 40 and 44 of clutch 42 are biased into coupling relation upon energization of a control solenoid 47 while upon de-energization of the solenoid 47, the plates 40 and 44 of clutch 42 are disengaged.

The wash-out circuit 32, as heretofore explained, may be of conventional type and is operatively controlled by a circuit including conductors 49 and 50 and a switch 51, which in the closed position shown, is effective to connect a battery 52 to wash-out circuit 32 so as to permit the passage of pitch controlling signals applied across the input conductors 30 and 33 through the wash-out circuit 32 to the output conductors 53 and 54 leading to an elevator control circuit 62 of an automatic pilot 60 which may be of conventional type and include a servomotor 63 controlled thereby for positioning an elevator surface 73 of an aircraft.

However, upon the operator actuating the switch 51 so as to disconnect battery 52 from the circuit 49, as hereinafter explained, and close a contact 98, the circuit 32 becomes effective to wash out the controlling signals applied there to across the input conductors 30 and 33.

Thus, application of the output voltage from the battery 52 through the closed switch 51 causes the wash-out circuit 32 to rise to unity gain with a predetermined rate. While removal of the voltage applied by the battery 52 by the opening of the switch 51 and closure of contact 98 causes the wash-out circuit 32 to fall to zero gain with a predetermined rate.

There is further connected from the battery 52, a conductor 70 which is connected through an operator-operative switch 72 to a conductor 74 which is in turn connected through a conductor 75 to effect energization of a solenoid 76 to engage a clutch 77 for operatively connecting the servomotor 63 of the automatic pilot 60 to a suitable elevator surface 73 of an aircraft.

The conductor 74 is in turn connected through a relay control switch 78 to a conductor 80 which is electrically connected to the clutch control solenoid 47 and a centering solenoid 81, the function of which will be explained hereinafter.

There is further provided a second switch 82 which is arranged to alternately close in one position a switch contact 83 to effect a shunt circuit about switch 78 and in a second position to close a switch contact 84 connected through a conductor 86 and a switch 88 to a heater element 90. The switch members 51 and 82 are connected through suitable linkage 89 and 95 to an operator-operative altitude hold control member 97.

The arrangement is such that, upon the operator actuating the member 97 in the direction indicated by the arrow to an altitude hold position, the switch 51 is actuated to a position to open the circuit 49 and close a switch contact 98, whereupon the conductors 49 and 50 are connected to render the circuit 32 effective, as heretofore explained, to wash out the pitch control signals. Moreover, the operation of the control member 97 to the altitude hold position which causes the switch 51 to open circuit 49 and close contact 98 will also cause switch element 82 to simultaneously open the switch contact 83 and close the switch contact 84 to render the heater element 90 effective.

The energization of the heater element 90 provides a time delay action to cause a bimetallic switch element 92 to close a switch contact 93 to effect energization of a control solenoid 94 which in turn will actuate the switch element 78 to an open circuit position and simultaneously cause the switch element 88 to open the circuit controlling energization of the heater element 90 and close a contact 91 for holding the control solenoid 94 in the energized condition.

The opening of the relay switch 78 will in turn effectively de-energize the centering solenoid 81 and the clutch control solenoid 47 whereupon the plates 40 and 44 of the clutch 42 are biased to a disengaging relation while the centering solenoid 81 is likewise de-energized.

The centering solenoid 81 is arranged to control through suitable mechanical linkage centering arms 100 and 102 of the potentiometer 12. The centering arms 100 and 102 are normally biased by spring elements 104 and 106 in a sense to hold the potentiometer control arm 34 in a null or center position.

However, upon energization of the centering solenoid 81, the arms 100 and 102 are biased by the centering solenoid 81 against the forces of the springs 104 and 106 to the dotted line positions shown in the drawing, in which positions potentiometer arm 34 may be adjustably positioned by the operator to one side or the other side of the center position so as to provide a pitch control signal across the input lines 30 and 33 to wash-out circuit 32.

The pressure bellows 65 is continuously responsive to the atmospheric pressure at the prevailing altitude and controls synchro 64 through an electromagnetic clutch 110 having clutch plates 112 and 114 normally held in disengaging relation. The clutch plates 112 and 114 are biased by a control solenoid 116 into a clutch engaging relation upon energization of the solenoid 116.

The synchro 64 is mechanically centered into a null signal position by a centering device 120 including opposing spring elements 121 and 122. The synchro 64 may be adjusted from the null signal position by operation of the bellows 65 upon the control solenoid 116 being energized so as to effectively engage the clutch plates 112 and 114 whereupon the bellows 65 may drive through the clutch 110 so as to overcome the opposing forces of the spring elements 121 and 122 of the centering device 120 and operatively position the rotor of the synchro 64 to one side or the other of the null signal position to in turn apply a controlling signal to the elevator control channel 62 to cause the servomotor 63 to operatively position the elevator of the aircraft.

This arrangement permits the synchro 64 to develop a signal in a sense depending on the direction in which the bellows 65 moves after engagement of clutch 110. Thus, the synchro 64 serves to develop an altitude error signal of a selected phase at the time the clutch 110 is engaged such as to cause operation of the servomotor 63 in a direction to position the aircraft elevator in a sense to cause the aircraft to seek the reference altitude.

The altitude error signal from the synchro 64 is applied into the signal chain 62 and also to the integrator 66 to control the aircraft to the reference altitude. The integrator synchro 68 is also initially mechanically centered to a null signal position by a centering device 130 including centering springs 131 and 132 prior to engagement of altitude hold and the rotor of the synchro 68 is coupled by an electromagnetic clutch 140 to the motor 141 of the integrator 66. The clutch 140 includes clutch plates 142 and 144 normally in a disengaging relation and biased by a control solenoid 146 into a clutch engaging relation upon energization of the solenoid 146.

As shown in the drawing, the control member 97 is operatively connected by a suitable linkage 150 to a switch 152 controlling energization of the fixed phase winding 154 of a servomotor 141 of the integrator 66. The control member 97 is further connected through a linkage 156 to a switch 158 for controlling energization of the solenoid 116 controlling the clutch 110. An electrical conductor 160 leads from the electrical conductor 75 to a switch contact 162 arranged for closure by the switch arm 158.

The arrangement is such that upon movement of the control member 97 in the direction of the arrow and to an altitude hold position, the switch 152 is actuated to a position closing the circuit for effecting energization of the fixed phase winding 154 while the switch 158 is simultaneously actuated to a position closing the contact 162 connecting the solenoid 116 to the conductor 75 for energization therethrough. Moreover, the solenoid 146 for controlling the clutch 140 is operatively connected through an electrical conductor 165 to the conductor 75 for effecting energization of the solenoid 146.

Further, it will be seen that upon closure of the operator-operative switch 72, the conductor 75 is energized so as to cause the solenoid 76 to actuate the clutch 77 into engaging relation for operatively connecting the servomotor 63 of the automatic pilot 60 to the elevator surface 73 of the aircraft. Simultaneously, with the energization of solenoid 76, a solenoid 146 is energized to operatively engage the clutch 140 to drivingly connect the motor 141 to the rotor winding of the synchro 68.

It will be noted, however, that the motor 141 remains in a de-energized condition until control member 97 is actuated to the altitude hold position closing the switch 152 controlling energization of the fixed phase winding 154. Further the solenoid 116 controlling the clutch 110 remains in a de-energized condition until the switch 158 is actuated to a position to close the switch contact 162 by operation of the control member 97 to the aforenoted altitude hold position.

Upon the operator-operative switch 72 being actuated to a circuit closing position and the control member 97 being actuated by the operator to the altitude hold position, the atmospheric pressure bellows mechanism 64–65 and the integrator mechanism 66 are brought into operation. In the latter operation, an error signal from the synchro 64 is operatively applied through a conductor 170 to the integrator mechanism 66 so as to control the operation of the motor 141 and through the clutch mechanism 140 which is now in the clutch engaging position, the position of the rotor of the synchro 68. The rotor of the synchro 68 is then driven by the servomotor 141 until the operator-operative switch 72 is again opened. The integrator 66 in the aforenoted operation causes the rotor of the output synchro 68 to be so positioned as to provide an output signal from the synchro 68 which acts in the same sense as the output signal from the synchro 64. The synchro 68 thus provides an output signal which is the time integral of the altitude error.

In the initial position of the system, the several elements thereof are in the various positions shown. However, upon the operator closing the switch 72 to bring the automatic pilot 60 into operation by energization of the solenoid 76 and engagement of clutch 77, the centering solenoid 81 is energized to bring the arms 100 and 102 into the position shown in dotted lines so as to free the control arm 34 and permit the operator to position the potentiometer control arm 34 so as to provide a selected pitch control signal across the input lines 30 and 33 to the wash-out circuit 32.

In this connection, it should be borne in mind that the closing of the switch 72 is also effective to simultaneously cause energization of the coupling solenoid 47 so as to bias the clutch 42 into a coupling relation, in which position the operator may adjustably position the knob 36 so as to position the potentiometer arm 34 to cause a pitch control signal to be applied across the input lines 30 and 33 to wash-out circuit 32.

Inasmuch as the control switch 51 for the wash-out circuit 32 is at that time in the closed circuit position shown, the wash-out circuit 32 will then be effective to pass therethrough the pitch control signals from the input lines 30 and 33 to the output lines 53 and 54 to be applied in turn to the elevator control circuit 62 of an automatic pilot 60 and cause the aircraft to climb or dive depending upon the selected operation of the pitch controller 10.

The passage of this pitch control signal into the elevator control circuit 62 will in turn cause the aircraft to climb or dive and the altitude of the aircraft thereof to be increased or decreased as the case may be.

As the aircraft changes altitude the bellows responds in synchronism with the existing altitude. However, upon the desired altitude of the aircraft being reached, the operator may selectively maintain the aircraft at such altitude by actuating the member 97 so as to open the switch 51 whereupon the wash-out circuit 32 is effective to diminish the pitch control signal applied to the elevator control circuit 62 while simultaneously with the opening of switch 51, the switch 82 opens contact 83 and closes contact 84 to cause energization of the time delay heater 90.

The heater 90 after a predetermined time delay period, is effective then to close a bimetallic switch 92 to energize solenoid 94 to open switch 78 so as to de-energize the solenoid 81 whereupon the operator-operative potentiometer arm 34 is returned to a null signal position as well as effect de-energization of the coupling control solenoid 47 so that the coupling 42 is rendered ineffective.

Thus, when the pilot desires the selected altitude to be held, he actuates the member 97 so as to open the switches 51 and 82, and the wash-out circuit 32 is thereupon rendered effective to reduce the pitch controller signal applied to circuit 62 to zero and the time delay heater 90 is energized.

Thereafter, when the wash-out is zeroed, the time delay heater 90 causes the bimetallic switch 92 to close the contact 93 energizing the solenoid 94. The solenoid 94 opens switch 78 and 88 and thereby opens the circuit to the time delay heater 90 and locks the solenoid 94 in an energized condition. The solenoid 94, upon energization, also causes switch 78 to open the circuit to the centering solenoid 81, as well as the coupling solenoid 47, whereupon the controller arm 34 is effectively returned to the center or null position.

Simultaneously, as the member 97 is operated to engage altitude hold, the synchro 64 is clutched to the bellows 65 and the integrator motor 141 is energized. The movement of the bellows 65 is transmitted to the synchro 64 to develop the error signal. The output of synchro 64 is applied jointly to the signal chain 62 and integrator 66. The synchro 64 error signal plus the integrator output synchro 68 signal are applied into the signal chain to control the aircraft to the referenced altitude which is determined by the bellows position at the time of altitude hold engagement.

When the pilot disengages the altitude hold by returning the switch arms 51, 152, 153 and 82 to the normal position shown, the closure of contact 83 by switch arm 82 effects energization of the solenoid 81 to cause arms 100 and 102 to release controller arm 34 for operation by the operator through the energized clutch 42 and allows subsequent pitch control signals to pass through the wash-out circuit 32. The pilot can now command a maneuver.

Also opening of contact 84 by switch arm 82 releases solenoid 94 to the de-energized position to restore the circuit in preparation for any subsequent re-engagement of altitude hold.

The opening of switch 152 disables the integrator which then remains at its last position maintaining its output.

The opening of switch 158 declutches the synchro 64 which is recentered by mechanism 120 to a null in preparation for the next engagement of altitude hold.

The pattern described, may be performed an unlimited number of times. The advantages of this arrangement, as described, are as follows:

(1) Since the controller 10 is recentered on altitude hold, there is no possibility of losing controller command.

(2) Moreover, since the wash-out 32 removes the controller signal, under altitude hold conditions, the integrator 66 of the automatic pilot 60 is relieved of this burden, thus increasing the authority of the integrator 66 under altitude hold conditions.

(3) Thereafter, the system will cause the aircraft to level out to a new altitude more rapidly, with less overshoot, because the controller command is zeroed rapidly by the wash-out circuit 32.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In an elevator controlling automatic pilot including means operable to adjust the elevator so as to maintain a selected altitude condition, a pitch controller operable in opposite senses from a null position to cause the automatic pilot to position the elevator so as to vary the flight altitude of the aircraft, operator-operative means for gradually rendering the pitch controller inoperative, and means responsive to operation of said operator-operative means for returning the said pitch controller to the null position upon the pitch controller being rendered inoperative.

2. In an elevator controlling automatic pilot including means operable to adjust the elevator so as to maintain a selected altitude condition, a pitch controller operable in opposite senses from a null position to cause the automatic pilot to position the elevator so as to vary the flight altitude of the aircraft, operator-operative means to render the pitch controller inoperative, means operative to return the pitch controller to the null position, and time delay means to render the last-mentioned means operative a predetermined delay period after the pitch controller has been rendered inoperative.

3. In an elevator controlling automatic pilot including means operable to adjust the elevator so as to maintain a selected altitude condition, a pitch controller operable in opposite senses from a null position to cause the automatic pilot to position the elevator so as to vary the flight altitude of the aircraft, operator-operative means to render the pitch controller inoperative, spring means operative to return the pitch controller to the null position, and time delay means to render the spring means operative a predetermined delay period after the pitch controller has been rendered inoperative.

4. In an elevator controlling automatic pilot including means operable to adjust the elevator so as to maintain a selected altitude condition, a pitch controller operable in opposite senses from a null position to effect a controlling signal for the automatic pilot to cause the positioning of the elevator so as to vary flight altitude of the aircraft, means operative in one sense to wash out the controlling signal from the pitch controller and in another sense to pass the controlling signal to the automatic pilot, and operator-operative means to selectively render the wash-out means operative in said one and said other sense.

5. In an elevator controlling automatic pilot including means operable to adjust the elevator so as to maintain a selected altitude condition, a pitch controller operable in opposite senses from a null position to effect a controlling signal for the automatic pilot to cause the positioning of the elevator so as to vary flight altitude of the aircraft, means operative in one sense to wash out the controlling signal from the pitch controller and in another sense to pass the controlling signal to the automatic pilot, and means to return the pitch controller to the null position after said wash-out means has been rendered operative in said one sense.

6. The combination defined by claim 5 including time delay means to render the pitch controller effective a predetermined delay period after the wash-out means has been rendered operative in said one sense.

7. In an aircraft control system having an atmospheric pressure-responsive device including a bellows, a first pick-off device for generating a first signal, a clutch to operatively couple the bellows to the first pick-off device, and an electromagnetic winding to render the clutch effective upon energization thereof; an integrator operative by the first signal generated by the first pick-off device, a second pick-off device operative by the integrator to generate a second signal acting in an additive sense to the first signal generated by the first pick-off device, servomotor means for adjustably positioning an elevator, and circuit means for operatively applying the signals generated by said first and second pick-off devices so as to control said servomotor means and thereby said elevator in a sense to maintain the altitude of the aircraft at a selected value; the combination comprising a pitch controller device for applying a third signal to said circuit means for controlling said servomotor means to position said elevator so as to vary the altitude of flight of the aircraft from an initially selected value, means operative in one sense to wash out the third signal from the pitch controller device and in another sense to pass the third signal to the circuit means, and operator-operative means to render the wash-out means selectively operative in said one and said other sense and said clutch operative to couple the bellows to said pick-off device upon said wash-out means being operative in said one sense.

8. The combination defined by claim 7 including spring means operative to bias the pitch controller device to a null signal position upon the operator-operative means rendering the wash-out means selectively operative in said one sense.

9. The combination defined by claim 8 including time delay means to render the spring means operative a predetermined time delay period after the wash-out means has been rendered operative in said one sense.

10. In an elevator controlling automatic pilot including means operable to adjust the elevator so as to maintain a selected altitude condition, a pitch controller operable in opposite senses from a null position to cause the automatic pilot to position the elevator so as to vary the flight altitude of the aircraft, operator-operative means to render the pitch controller inoperative at a selected flight altitude, means responsive to operation of said operator-operative means for maintaining said aircraft at said selected flight altitude, and means to return the pitch controller to the null position upon the pitch controller being rendered inoperative.

References Cited by the Examiner
UNITED STATES PATENTS

| | | | |
|---|---|---|---|
| 2,474,618 | 6/49 | Divoll | 318—481 |
| 2,512,902 | 6/50 | Rossire | 318—481 |
| 2,923,501 | 2/60 | Seliger | 344—77 |

JOHN F. COUCH, *Primary Examiner.*